United States Patent [19]

Janssen

[11] 4,200,882
[45] Apr. 29, 1980

[54] COLOR TELEVISION CRT BEAM CURRENT CORRECTION CIRCUIT

[75] Inventor: Peter J. H. Janssen, Eindhoven, Netherlands

[73] Assignee: U.S. Philips Corporation, New York, N.Y.

[21] Appl. No.: 929,021

[22] Filed: Jul. 28, 1978

[30] Foreign Application Priority Data

Aug. 25, 1977 [NL] Netherlands .......................... 7709362

[51] Int. Cl.² .............................................. H04N 9/20
[52] U.S. Cl. ........................................ 358/29; 358/65; 358/74
[58] Field of Search ..................... 358/29, 34, 64, 65, 358/74

[56] References Cited

U.S. PATENT DOCUMENTS

4,064,417 12/1977 Smith .................................. 358/29 X

Primary Examiner—Robert L. Richardson
Attorney, Agent, or Firm—Thomas A. Briody; William J. Streeter; Edward W. Goodman

[57] ABSTRACT

Multi-gun color television display apparatus having for each gun an identical beam current reference level control system wherein the relative position of a reference level in the video signal and a setting voltage of the electron guns are periodically shifted for obtaining, for the control system outside the measuring periods, a coincidence of the reference level in the video signal and the cut-off point of each of the electron guns for a proper color rendition at a low brightness.

4 Claims, 9 Drawing Figures

COLOR TELEVISION CRT BEAM CURRENT CORRECTION CIRCUIT

BACKGROUND OF THE INVENTION

The invention relates to a colour television display apparatus having a beam current reference level control circuit comprising a measuring circuit included in the cathode circuits of the electron guns of a multi-gun colour display tube for measuring during a measuring period the beam current reference level to be corrected, a level insertion circuit for providing during said measuring period a reference level in a video signal to be applied to each gun of the display tube, and a beam current level correction circuit coupled to the measuring circuit and to a control electrode of each gun of the display tube for obtaining substantially the same beam current reference level in each of the electron guns.

The Dutch Patent Application No. 7202401 (PHN 6130) discloses a colour television display apparatus of the above-mentioned type wherein by the use of a sequence circuit a great portion of the beam current reference level control circuits is in common for the different electron guns of the picture display tube. Then the beam current reference levels of these guns cannot substantially differ from one another. The colour rendition of this apparatus is very constant and substantially independent of disturbing influences. However, in general, the phosphors of the picture display tubes do not have the same efficiency so that the colour rendition for low luminance values is not quite correct if this rendition is correctly adjusted for high luminance values. It would be possible to obtain a correct rendition for low luminance values by using a beam current reference level which would be much lower than the presently used value of some $\mu A$. This has practical disadvantages. In addition it would, for example, be possible to perform a correction by means of a circuit with which the beam current reference levels could be adjusted in a ratio matched to the efficiency of the phosphors. This would not only require an adjustment for high luminances but also an additional adjustment at a low luminance.

SUMMARY OF THE INVENTION

It is an object of the invention to obtain a correct colour rendition at that low luminance without an additional adjustment at a low luminance.

To this end a colour television diaplay apparatus of the type mentioned in the preamble according to the invention is characterized in that the electron guns of the picture display tube are coupled to a level shift circuit for shifting at each electron gun, over substantially a same value, the mutual position of the reference level in the video signal and a setting voltage of the electron gun outside the measuring period relative to that mutual position during the measuring period.

The value of the voltage with which the level shift is obtained is the same for all three guns because the beam current reference levels are the same. No adjustment of a mutual amplitude ratio is then required. In addition, the value of this voltage depends substantially only on the beam current reference level value and a plurality of other known and constant factors, so that it can be obtained by means of a proper rating of the circuit so that no adjustment is required.

DESCRIPTION OF THE DRAWING

The invention will now be further explained with reference to the drawings.

In the drawings

DESCRIPTION OF THE PREFERRED EMBODIMENT

Figure 1:
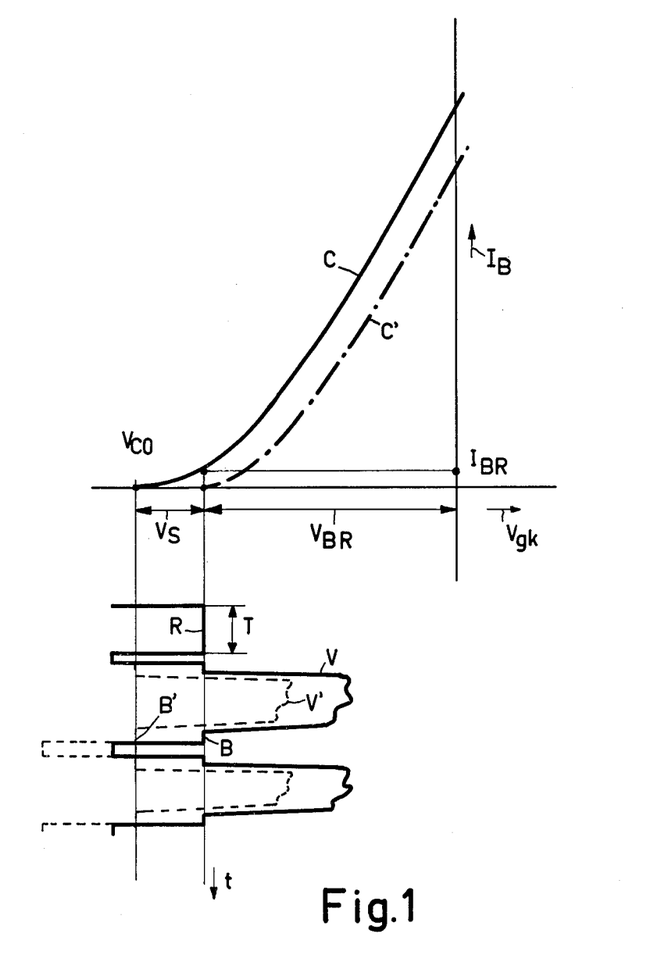
FIG. 1 shows on the basis of a diagram the underlying principle of the invention.

In FIG. 1 a curve C shows how the beam current $I_B$ of an electron gun of a picture display tube varies as a function of the Wehnelt cathode voltage $V_{GK}$. Furthermore, a video signal V is shown as a function of the time with which the Wehnelt cathode voltage can be varied. During a measuring period T the video signal V has a reference level R. In a picture display apparatus according to the invention the beam current is measured during this measuring period T and controlled by means of a beam current reference level control circuit to a constant beam current reference value $I_{BR}$ of some $\mu A$. To this end the control circuit continuously readjusts, for example, the Wehnelt cathode voltage $V_{BR}$. The video signal V has a black level B which substantially coincides with the reference level R.

In a colour display apparatus according to the invention a beam current reference control circuit is present for each electron gun of the picture display tube. If these control circuits are mutually equal—which, for example, can be accomplished in a simple manner by using a sequentially measuring circuit which may be in common for a great portion of the three electron guns—then the beam current reference value of each gun is adjusted to the same value $I_{BR}$. At this beam current value the phosphors of the picture screen of the picture display apparatus emit a very small quantity of light which, however, due to the difference in efficiency of the phosphors, are not equal so that a certain colour will be somewhat more predominant. Due to the control circuits, this colour remains very constant. With a low-level drive of the picture display tube, so if the video signals are near the black level, a colour deviation occurs which is the smaller in proportion, as the amplitude of the video signals are greater because, for a white rendition occurring at the maximum amplitude, the amplitude ratio of the video signals is readjusted.

In order to obtain a proper colour rendition also at a low video signal amplitude, the luminance must occur for all three colours in the same ratio as with a high video signal amplitude. As known, this can be accomplished by having the black levels B in the video signals coincide with the cut-off points $V_{co}$ of the electron guns. Then, however, no beam current occurs and a control of that current is impossible.

It has appeared that the difference $V_s$, between the cut-off voltage $V_{co}$ and the voltage $V_{BR}$ applied by the control circuits to the guns, is substantially constant even if the voltage $V_{BR}$ must vary, due to disturbing influences, to keep $I_{BR}$ constant. This applies to each of the three electron guns. By shifting the video signal and consequently the black level B outside the measuring period T for each of the three guns over an amount $V_s$, a proper colour rendition for low video signal amplitudes can yet be obtained while maintaining the beam current reference level control system. This shift is shown in the figure by means of a dotted video signal curve V' having a black level B' which substantially coincides with the cut-off position $V_{co}$. An additional method is to shift the characteristics of the electron guns of the picture display tube outside the measuring period T to the position indicated by a dashed-dotted line. A combination of these methods is also possible. Some circuit possibilities for obtaining said level shifts will be indicated below. The value $V_s$ can be calculated from $$V_s = k \sqrt{V_{co}} \sqrt[3]{I_{BR}}$$

where k is a constant which depends on the construction of the electron gun and which can be easily determined.

For a cut-off voltage of 175 V the following table applies for the electron guns which are used most frequently at the moment

| | |
|---|---|
| $I_{BR} = 2\mu A$ | $V_s = 11.56$ Volts |
| $I_{BR} = 3\mu A$ | $V_s = 13.23$ Volts |
| $I_{BR} = 4\mu A$ | $V_s = 14.56$ Volts |

If the characteristics of the picture display tube are known, this level shift voltage can, if so desired, be converted into a shift voltage for a screen grid of the picture display tube.

If the amplitude of the level shift voltage deviates somewhat from these values, the displayed colour will indeed not be perfectly identical, during the occurrence of the black level in the video signal, to the colour when the white level occurs but a considerably more accurate colour rendition is yet obtained at low video signal amplitudes than if no level shift were used.

Figure 2:
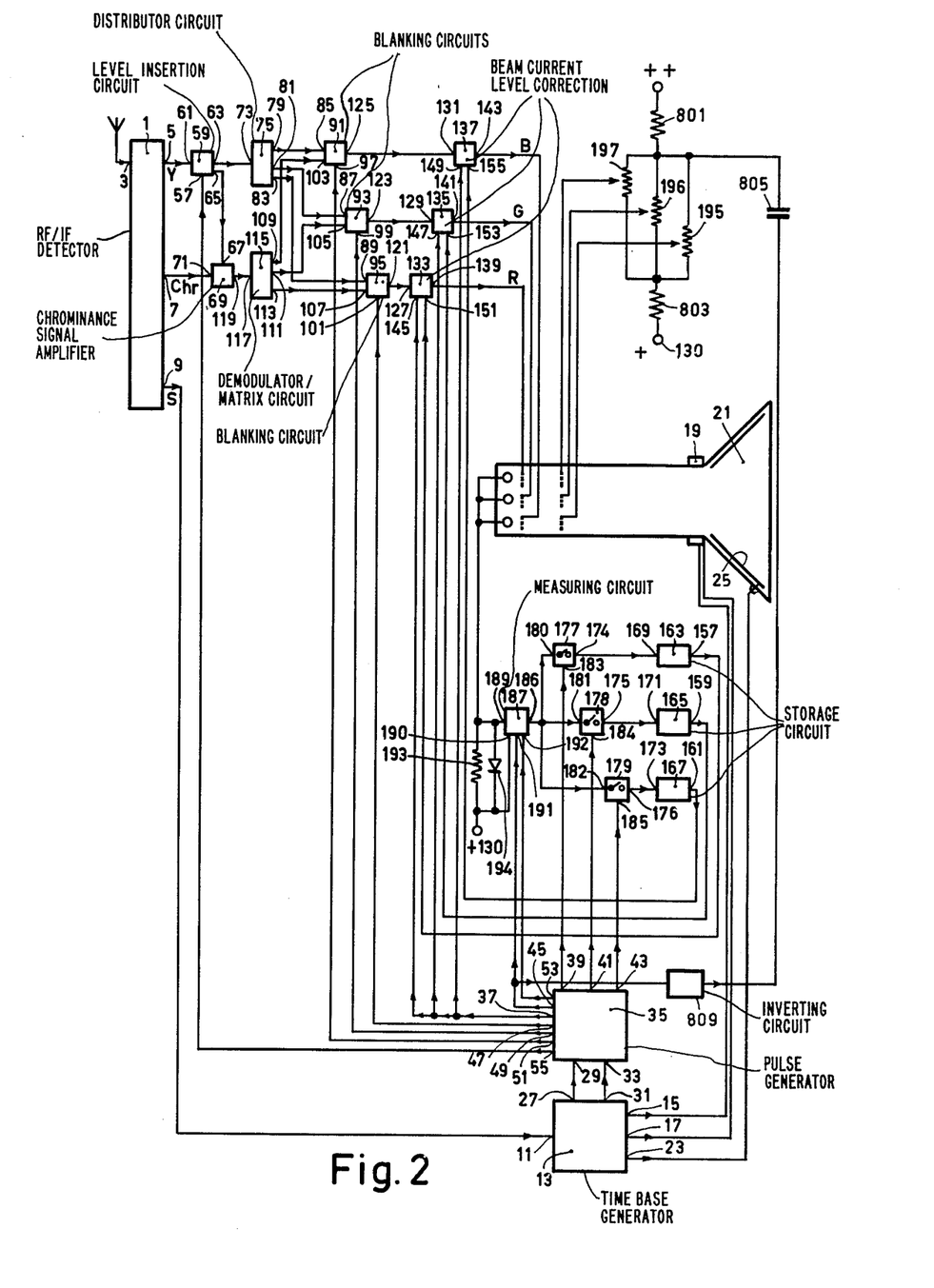
FIG. 2 shows, with reference to a block diagram, a colour television receiver having a display apparatus including a level shift circuit according to the invention.

In FIG. 2 an RF, IF and detector section 1 has an input 3 to which a colour television signal to be processed may be applied. This results in a luminance signal Y at an output 5 of section 1, a chrominance signal Chr at an output 7 and a synchronizing signal S at an output 9.

The synchronizing signal S is applied to an input 11 of a time base generator 13. Deflection currents are obtained from two outputs 15 and 17 which are connected to a deflection coil system 19 of a display tube 21, and an EHT, for feeding an anode 25 of the display tube 21, is obtained from an output 23 of the time base generator 13.

Figure 3:
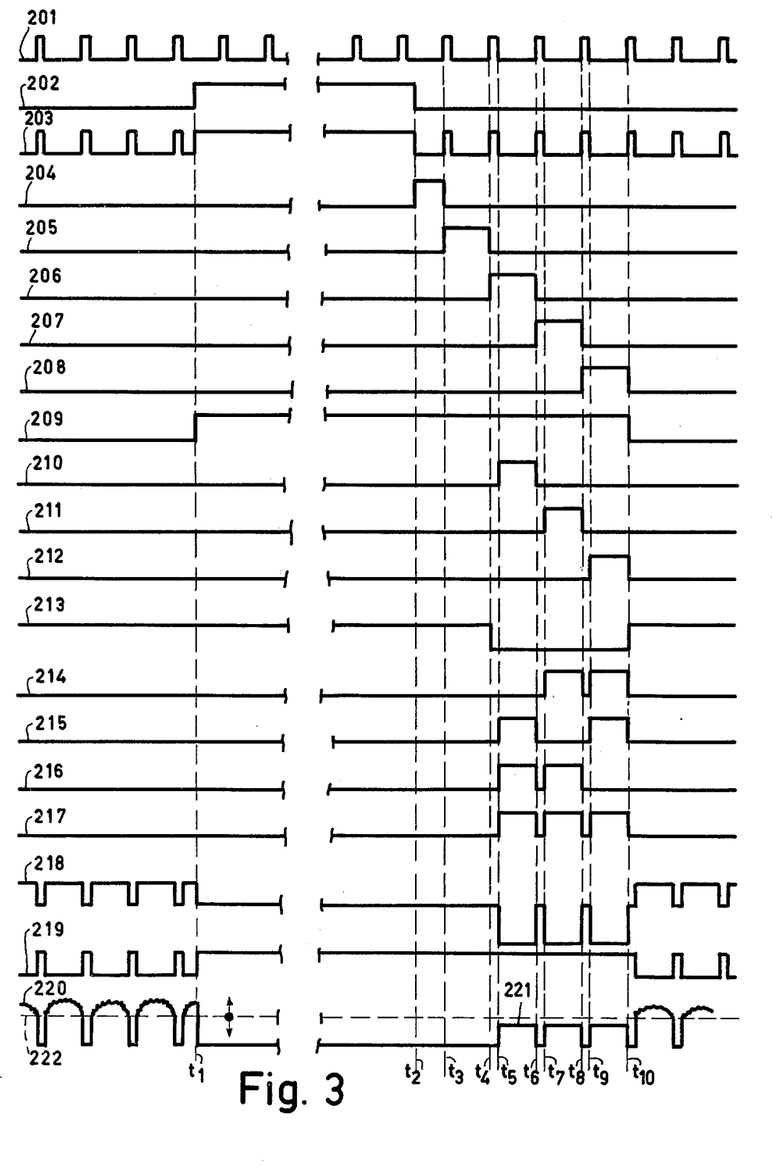
FIG. 3 shows wave forms occurring in different points in the circuit of FIG. 2.

An output 27 of the time base generator 13 supplies line flyback pulses to an input 29 of a pulse generator 35 and an output 31 supplies field flyback pulses to an input 33 of the pulse generator 35. In FIG. 3 these pulses are represented by the waveforms 201 and 202, respectively. FIG. 3 furthermore shows a number of waveforms 203, 204 . . . 220 and a number of instants $t_1$, $t_2$ . . . $t_{10}$ which are of interest for the explanation of the operation of the circuit. The waveforms have not been drawn to scale.

The pulse generator 35 has a number of outputs 37, 39, 41, 43, 45, 47, 49, 51, 53 and 55 at which the waveforms 203, 210, 211, 212, 213, 214, 215, 216, 217 and 218, respectively, are available.

The output 55 of the pulse generator 35 is connected to an input 57 of a level insertion circuit 59 whose input 61 is connected to output 5 of section 1 from which it receives the luminance signal Y. The level insertion circuit 59 has an output 63 at which the modified luminance signal represented by waveform 220 of FIG. 3 is available, which, during three line periods $t_5$-$t_6$, $t_7$-$t_8$, $t_9$-$t_{10}$ at the beginning of a field, comprises a reference level 221 which has been inserted with the aid of the waveform 218 applied to the input 57.

At a further output 65 of the level insertion circuit 59 the waveform 219 is available which is applied to an input 67 of a chrominance signal amplifier 69 for suppressing the chrominance signal applied to an input 71, which is connected to the output 7 of section 1.

The output 63 of the level insertion circuit 59 is connected to an input 73 of a distributor circuit 75 of which three outputs 79, 81, 83 are connected to inputs 85, 87 and 89, respectively, of three blanking circuits 91, 93 and 95, respectively. Inputs 97, 99 and 101 of these blanking circuits 91, 93, 95 are connected to outputs 51, 49 and 47, respectively, of the pulse generator 35 and inputs 103, 105 and 107 are connected to outputs 109, 111 and 113, respectively, of a demodulation and matrix circuit 115, a chrominance signal coming from an output 119 of the chrominance signal amplifier 69 being applied to an input 117 of said demodulation and matrix circuit 115.

The demodulation and matrix circuit 115 produces (B-Y), (G-Y) and (R-Y) colour difference signals at its outputs 109, 111 and 113, respectively. In the blanking circuits 91, 93 and 95, these colour difference signals are added to a modified luminance signal from the distributor circuit 75 to obtain the colour signals R, G and B; the reference signal 221, derived from the luminance signal, being suppressed in a special sequence due to the signals having the waveforms 214, 215 and 216 at the inputs 97, 99 and 101. In this example, such a sequence is adhered to that, in the R-signal, a reference level is left from $t_5$ till $t_6$ only, in the G-signal from $t_7$ till $t_8$ and in the B-signal from $T_9$ till $T_{10}$. These signals with the relevant reference level are available at outputs 121, 123 and 125 of the blanking circuits 95, 93 and 91, respectively and are fed to inputs 127, 129 and 131 of beam current level correction circuits 133, 135 and 137, respectively, in which these reference levels are coupled to a certain beam current value of a corresponding electron gun of the display tube 21.

The beam current level correction circuits 133, 135 and 137 have outputs 139, 141 and 143, respectively, which are connected to the Wehnelt electrodes of the "red", the "green" and the "blue" gun, respectively, of the display tube 21. Furthermore, inputs 145, 147 and 149 of said blanking correction circuits are connected to the output 37 of the pulse generator 35 in order to supply a blanking signal which, during the time base flyback periods, prevents a signal from being applied to the display tube 21. Inputs 151, 153 and 155 are furthermore connected to outputs 157, 159 and 161 of storage circuits 163, 165 and 167, respectively, of a sequence circuit.

Inputs 169, 161 and 173 of the storage circuits 163, 165 and 167 are connected to outputs 174, 175 and 176 of switches 177, 178 and 179, respectively, whose control signal inputs 183, 184 and 185 are connected to the outputs 39, 41 and 43, respectively, of the pulse generator 35.

The switch 177 conducts only from $t_5$ till $t_6$, switch 178 from $t_7$ till $t_8$ and switch 179 from $t_9$ till $t_{10}$. Each of these switches feeds a level applied to one of its inputs 180, 181 and 182, respectively, into the relevant storage circuits 163, 165, 167.

The inputs 180, 181, 182 are connected to an output 186 of a measuring circuit 187 having an input terminal 189 connected to the interconnected cathodes of the display tube 21, an input terminal 190 connected to a positive voltage of 130 volts, an input 191 connected to the output 45 of the pulse generator 35 and an input 192 connected to the output 53 of the pulse generator 35.

The interconnected cathodes of the display tube 21 are also connected to the positive voltage of +130 volts via a parallel connection of a resistor 193 and a diode 194. The screen grids of the guns are each connected to an adjustable tap of potentiometers 195, 196, 197 which are arranged in series with two potentiometers 801, 803 between +130 v and a higher voltage ++.

The measuring circuit 187 transfers a beam-current dependent voltage, which is consecutively caused by the reference level of the signal at each of the Wehnelt electrodes, to switches 177, 178, 179 which retain these voltages in the memory circuits 163, 165, 167 during the field period and which transfer these voltages to the inputs 151, 153, 155 of the beam current level correction circuits 133, 135, 137. During this transfer, the other guns draw no beam current. This results in a stabilisation of the beam current of each gun corresponding to the reference level in the luminance signal, using only one measuring circuit 187 which influences each of the control loops thus obtained in exactly the same manner.

A beam current control thus obtained on a reference level ensures a very good setting of the three guns of the display tube 21 which, at a sufficient gain in the control loop, always results in a constant colour of signals of low brightness, so-called background brightness, independent of, for example, supply voltage and temperature variations.

To ensure that this colour is the proper colour a pulse is supplied via a capacitor 805 to the tops of the parallel-arranged potentiometers 195, 196, 197 which pulse is obtained via an inverting circuit 809 from the output 45 of the pulse generator 35 and which, consequently, has a waveform which is opposite to waveform 213. Each of the screen grids of the picture display tube 21 is supplied with a pulse of substantially the same amplitude so that the setting of the electron gun of the picture display tube 21, during the occurrence of the video signal, is shifted relative to that during the occurrence of the reference level at which the beam current is stabilised. By means of a proper choice of the amplitude of this pulse the black level in the video signal at each electron gun is substantially placed in the cut-off point of this gun. The screen grid potentiometers 195, 196, 197 are adjusted so that the Wehnels voltages are mutually equal during occurrence of a black level. Because the gain factors of the screen grid can somewhat deviate from a standard value the adjustment of potentiometers 195, 196, 197 may differ somewhat. The level shift voltage is supplied to the tops of the potentiometers 195, 196, 197 and consequently has a somewhat different amplitude at the screen grids in a manner which is then accurately adapted to the relevant gain factors of the screen grids. A customary adjusting procedure for a white-signal is now sufficient to obtain a proper rendition at any level of the video signals.

The circuit 809, 805, 195, 196, 197 is used as a level shift circuit with which the cut-off point of each of the electron guns, outside the measuring period, substantially coincides with the black level in the video signals.

Figure 9:
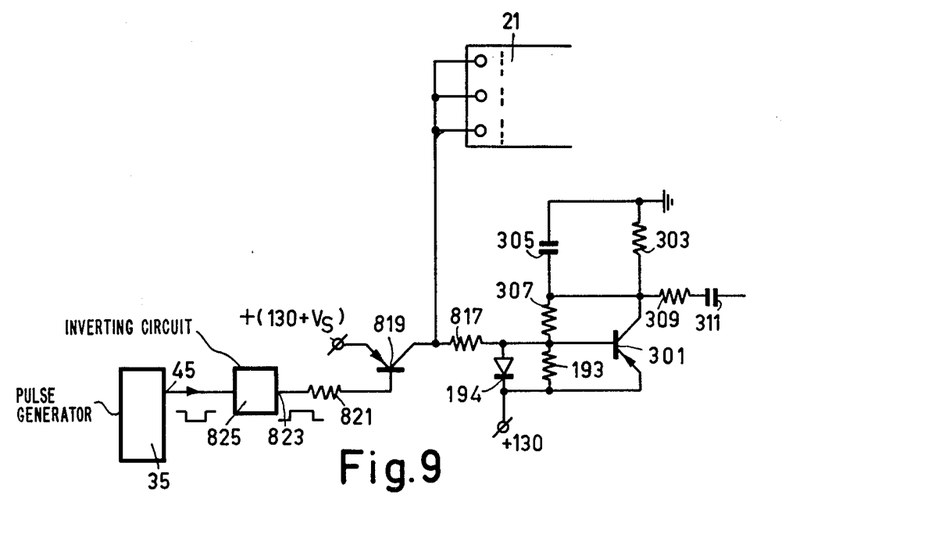
FIG. 9 shows, with reference to a concise principle circuit diagram, a possible embodiment of a level shift circuit in the cathode circuits of the picture display tube for a display apparatus according to the invention.

A possible implementation of another circuit with which the same results can be achieved and which is operative in the cathode circuit of the picture display tube is shown in FIG. 9.

Figure 8:
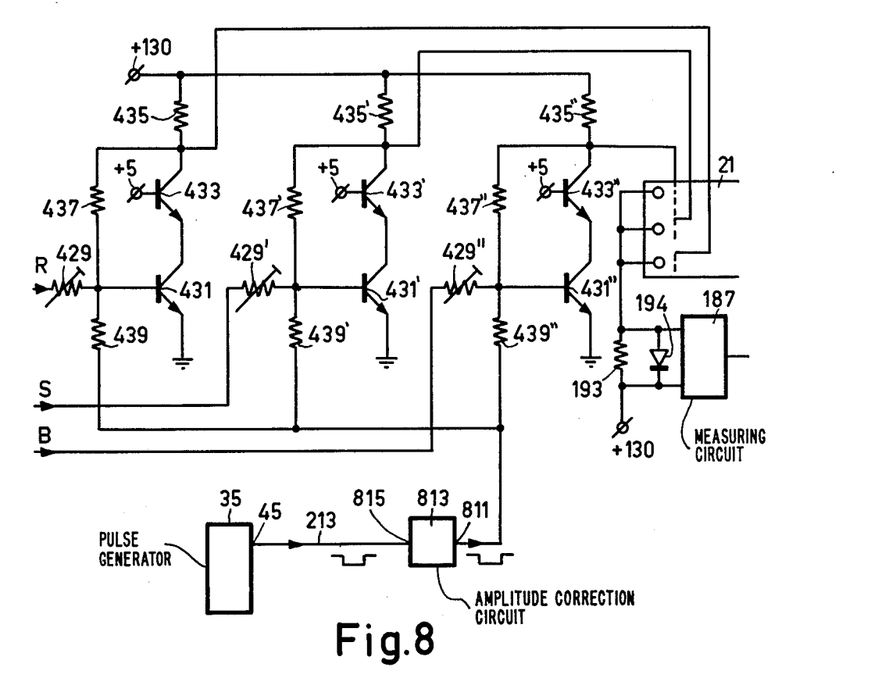
FIG. 8 shows, with reference to a concise principle circuit diagram, a possible embodiment of a level shift circuit in the Wehnelt circuits of the picture display tube for a display apparatus according to the invention

It is alternatively possible to perform a level correction in each of the video signals. This is illustrated in FIG. 8.

Figure 4:
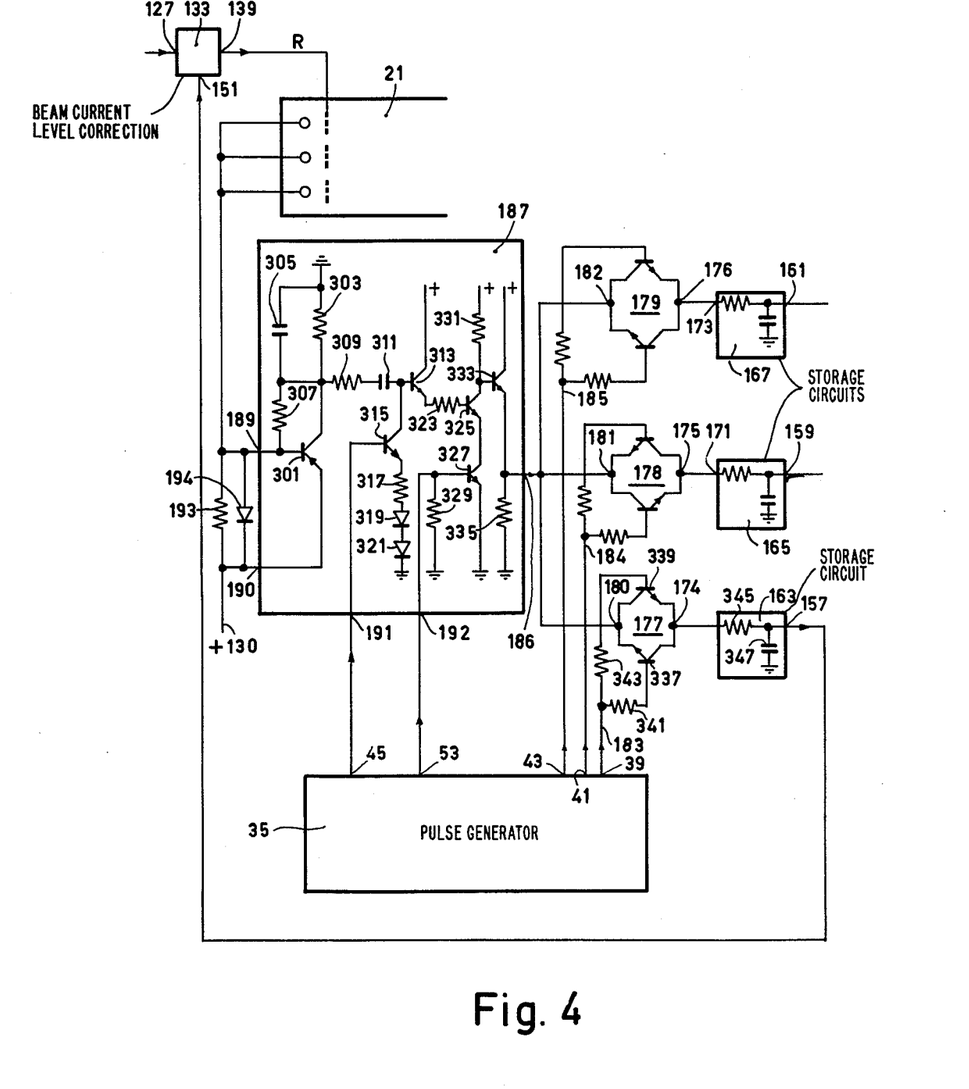
FIG. 4 shows, with reference to a principle circuit diagram, an embodiment of a measuring circuit and a sequence circuit for a display apparatus according to the invention.

In FIG. 4 corresponding sections have the same reference numerals as in FIG. 2. FIG. 4 illustrates one of the three beam current reference level-clamping control circuits and the common measuring amplifier 187 for the three reference level-clamping control loops, the sequence switches 177 and the beam current level correction circuit 133.

A signal occurring at the cathodes of the display tube 21 causes a voltage across the resistor 193 which voltage is limited by the protection diode 194, which is cut off during the measuring intervals. This voltage is applied to the input terminals 189, 190 of the measuring amplifier 187. The input terminals 189, 190 are connected to the base and emitter, respectively, of a pnp-transistor 301 whose collector is connected to ground via a resistor 303, is grounded with respect to high frequencies via a capacitor 305 and has a negative feedback coupling to the base via a resistor 307.

A signal amplified by the transistor 301 is fed to the base of an npn-transistor 313 via a series connection of a resistor 309 and a capacitor 311. Connected to the base of transistor 303 is the collector of an npn-transistor 315 which serves as a clamping switch, the emitter of the transistor 315 being connected to ground via a series connection of a resistor 317 and two diodes 319 and 321 and the base of the transistor 315 being connected to the input 191 of the circuit 187.

Due to the waveform 213 which is applied to the input 191, the transistor 315 is cut off only during the occurrence of the signal caused by the reference signal 221 at the cathodes of the display tube 21. During the preceding line periods the capacitor 311 has assumed a constant charge condition, (has been clamped) via transistor 315 which is then conducting, as a result of the absence of a signal at the cathodes of the display tube 21, because both the chrominance signal and the luminance signal are then suppressed. The diodes 319 and 321 then provide a clamping level at the base of transistor 313. During the interval $t_4$–$t_{10}$, signals caused by the reference level 221 during time intervals $t_5$–$t_6$, $t_7$–$t_8$ and $t_9$–$t_{10}$, respectively occur at the successive cathodes of the display tube 21. These signals occur at the base of the transistor 313 in amplified form and, via the emitter of the transistor 313 and a series resistor 323, they drive the base of the an npn-transistor 325. The emitter of transistor 325 is connected to the collector of an npn-transistor 327 whose emitter is connected to ground and whose base is connected to the input 192, and via a resistor 329, to ground.

The waveform 217 is fed to the base of the transistor 327 so that, only during the time intervals $t_5$–$t_6$, $t_7$–$t_8$, $t_9$–$t_{10}$, the emitter of transistor 325 is grounded via transistor 327; and transistor 325 functions as an amplifier so that only then a signal is produced at its collector across a resistor 331. This signal is fed to the base of an npn-transistor 333 which is connected in emitter follower arrangement and whose emitter is connected to the output 186 and via a resistor 335, to ground.

At the output 186, a signal is obtained having levels which are produced by each of the cathodes in succession during the previously mentioned time intervals. These levels are a measure of the beam current of the relevant gun and are transferred via switches 177, 178 and 179 consecutively, to the memory circuit 163 during the time interval $t_5$–$t_6$, to the memory circuit 165 during the time interval $t_7$–$t_8$, and to the memory circuit 167 during the time interval $t_9$–$t_{10}$.

Switch 177 is formed by two npn-transistors 337, 339, connected in opposition, whose respective bases are connected via resistors 341, 343 to the input 183 which, during the time interval $t_5$–$t_6$, receives a positive pulse represented by the waveform 210 from output 39 of pulse generator 35. As a result, the two transistors 337 and 339 are conducting during this time interval. These transistors are cut off for the rest of the time. During the time interval $t_5$–$t_6$ input 180 of the switch 177 is then connected to output 174 thereat and via input 169 of the memory circuit 163, to a resistor 345 whose other terminal is connected to a capacitor 347 whose other side is connected to ground.

In time interval $t_5$–$t_6$ capacitor 347 is charged to the level occurring at the output 186 of the measuring amplifier 187 which, via the output 157, is fed to the input 151 of the beam current level correction circuit 133 and, by means of which, the beam current, caused by the reference signal 221 in the gun of the display tube 21 connected to the output 199, is maintained constant.

In a similar manner the beam currents of the other guns are stabilized in the time intervals $t_7$–$t_8$ and $t_9$–$t_{10}$.

Figure 5:
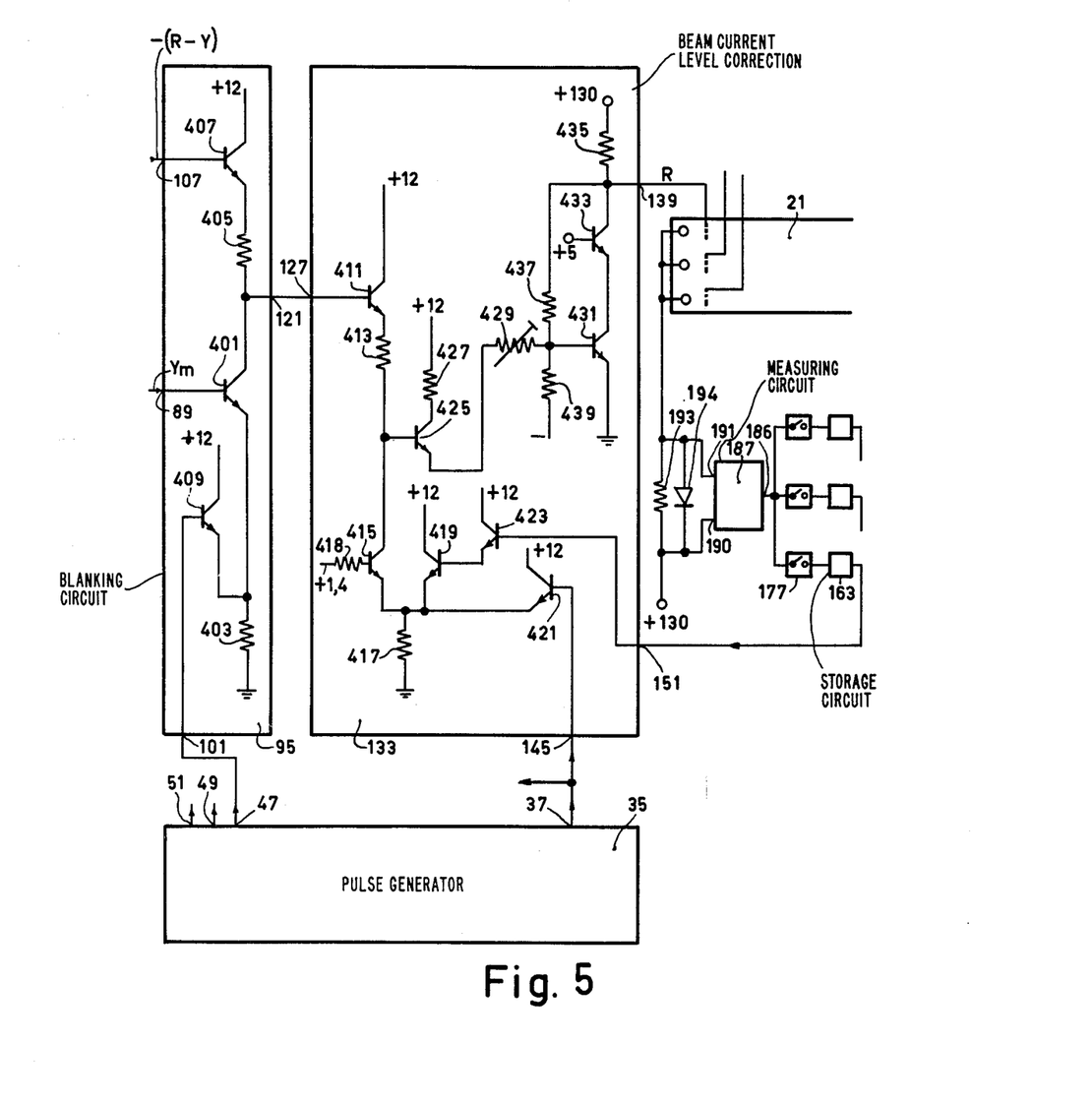
FIG. 5 shows, with reference to a principle circuit diagram, an embodiment of a blanking circuit and a beam current level correction circuit for a display apparatus according to the invention.

In FIG. 5 corresponding sections have the same reference numerals as in FIG. 2 and FIG. 4. In FIG. 5 one of the blanking circuits 95 and the corresponding beam current level correction circuit 133 are shown, as well as their relationship with the reference level control circuit referred to in FIG. 4.

A modified luminance signal $Y_m$ with the waveform 220 is applied to the input 89 of the blanking circuit 95 which, during the time intervals $t_5$–$t_6$, $t_7$–$t_8$ and $t_9$–$t_{10}$, contains the reference level 221 which is suppressed from $t_1$ till $t_5$. The input 89 is connected to the base of an npn-transistor 401 whose emitter is grounded via a resistor 403 and whose collector is connected to the emitter of an npn-transistor 407 via a resistor 405. The collector of the transistor 407 is connected to a positive voltage, and the base is connected to the input 107 and receives a red colour difference signal $-(R-Y)$ which is suppressed from $t_1$ till $t_{10}$.

The output 121 of the blanking circuit 95 is connected to the collector of the transistor 401. Connected to the emitter of the transistor 401 is the emitter of an npn-transistor 409 whose collector is connected to a positive voltage and whose base is connected to the input 101.

A voltage of the waveform 214 is fed to the input 101 so that transistor 409 is conducting during the time intervals $t_7$–$t_8$ and $t_9$–$t_{10}$ due to which the transistor 401 cuts off and transistor 407 draws no current either and the signal at the output 121 is suppressed.

When transistor 409 is not conducting, a combination of the $-(R-Y)$ signal, supplied via the emitter follower 407 and the $-Y_m$ signal, supplied via the amplifier transistor 401, is fed to the output 121. This combination is a $-R$ signal containing a reference level corresponding to level 221 during the time interval $t_5$–$t_6$, said reference level being suppressed in the time intervals $t_1$–$t_5$ and $t_6$–$t_{10}$. Via the input 127 of the beam current level correction circuit 133, this signal is applied to the base of an npn-transistor 411 whose collector is connected to a positive voltage and whose emitter is connected via a resistor 413 to the collector of an npn-transistor 415 whose emitter is grounded via a resistor 417 and whose base is connected to a reference voltage via a resistor 418.

The emitter of the transistor 415 is furthermore connected to the emitters of two npn-transistors 419 and 421 whose collectors are connected to a positive supply voltage.

Via an npn-transistor 423 which is connected as an emitter follower, a level correction voltage applied to the input 151 is transferred to the base of the transistor 419, while a blanking signal with the waveform 203 applied to the input 145 is transferred to the base of the transistor 421. The blanking signal suppresses the beam currents during the line field flyback periods in the usual manner. As the transistor 421 only becomes conducting during these flyback periods, the transistor 415 is cut off and no signal is supplied to the collector of the transistor 415 because the emitter circuit of the transistor 411 is then interrupted.

The level correction voltage applied to the input 151 is fed to the emitter of the transistor 415 via the emitters of the transistors 423 and 419 and influences the direct current through the resistor 413 which is supplied by the transistor 415 and thus the d.c. level of the $-R$-signal transferred to the collector of the transistor 415 via the emitter of the transistor 411.

The collector of the transistor 415 is connected to the base of an npn-transistor 425 whose collector is connected to a positive supply voltage via a resistor 427 and whose emitter is connected to the base of an npn-transistor 431 via a variable resistor 429. The emitter of the transistor 431 is connected to ground and the collector is connected to the emitter of an npn-transistor 433 whose collector is connected to a positive supply voltage of +130 V via a resistor 435. The base of the transistor 431 receives a negative feedback voltage from the collector of the transistor 435 via a potential divider of resistors 437, 439.

A red colour signal R, amplified by transistors 431 and 433, is obtained from the collector of transistor 433, which signal is fed via the output 139 to the Wehnelt electrode of the red gun of the display tube 21. The gain of the beam current level correction circuit 133 is adjustable with resistor 429 in order to enable a white-point correction. Due to the clamping control loop, a white-point correction hardly affects the beam current which is caused by the reference signal 221 so that the adjustment of the resistor 429 will not change the black level and, thus, neither the colour of the dark portions in the image.

Figure 6:
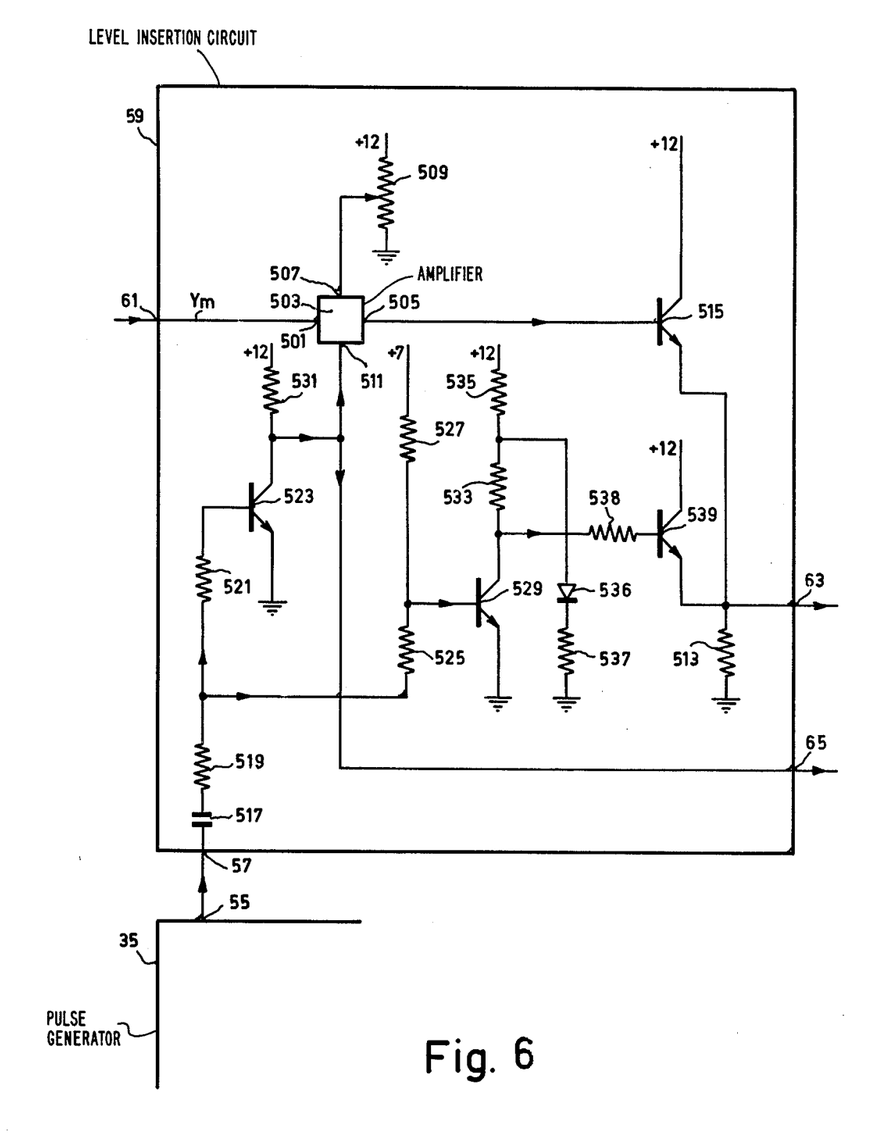
FIG. 6 shows, with reference to a principle circuit diagram, an embodiment of a level insertion circuit for a display apparatus according to the invention.

In FIG. 6 the same reference numerals have been used as in FIGS. 2, 4 and 5 for the corresponding sections of the circuit. FIG. 6 shows a level insertion circuit 59.

A luminance signal is applied to the input 61 of said circuit which signal is fed to an input 501 of an amplifier 503. The amplifier 503 furthermore has an input 507, to which a direct voltage is applied, which is adjustable with a potentiometer 509, and which serves for brightness control, and an input 511 to which a blanking signal is applied having the waveform 219 of FIG. 2. The picture black level 22 in waveform 220 is adjustable by means of the potentiometer 509 relative to the level occurring during the blanking periods. The waveform 220 is the luminance signal occurring at the output 63 across an emitter resistor 513 of an npn-transistor 515, which is connected as an emitter follower and whose base is connected to the output 505 of the amplifier 503.

A signal with the waveform 218 is fed to the input 57 of the level insertion circuit 59. Via a capacitor 517 and a resistor 519, said signal is applied to a splitter, one side of which is connected to the base of an npn-transistor 523 via a resistor 521 and the other side to the basis of an npn-transistor 529 via a potential divider of resistors 525, 527.

During the most positive parts of the waveform 218 a low voltage develops across the collector resistor 531 of the transistor 523. The level of the signal in time intervals $t_5$–$t_{10}$ lies below the cutoff point of the transistor 523 so that this signal is not contained in the collector signal 219 of the transistor 523. However, due to the potential divider 525, 527, which is connected to a positive voltage, the transistor 529 only responds to the most negative portions of the signal 218 and the transistor 529 is cut off during time intervals $t_5$–$t_6$, $t_7$–$t_8$ and $t_9$–$t_{10}$ so that positive-going square-wave voltages will then occur on the collector of the transistor 529.

Via a resistor 533, the collector of the transistor 529 is connected to a potential divider with a resistor 535 and a series connection of a diode 536 and a resistor 537. The voltage on the tap of this potential divider has a constant value of +2.2 V which also occurs on the collector of the transistor 529 in the abovementioned time intervals. Via a resistor 538, this voltage is transferred to the base of an npn-transistor 539 whose collector is connected to a positive supply voltage and whose emitter is connected to the emitter of the transistor 515. In the time intervals $t_5$–$t_6$, $t_7$–$t_8$ and $t_9$–$t_{10}$ the emitter voltage of transistor 539 becomes +1.5 V due to its base voltage so that the transistor 515 is cut off and the reference level 221 is produced at the output 63. For the rest of the time the transistor 539 is cut off and a signal is applied to the output 63 via the transistor 515.

As becomes apparent from the waveform 220 the black level 222 of the signal is also adjustable relative to the constant reference level 221 which, due to the previously discussed beam current reference level control circuits, corresponds to a constant beam current value in each of the guns of the display tube 21.

Figure 7:
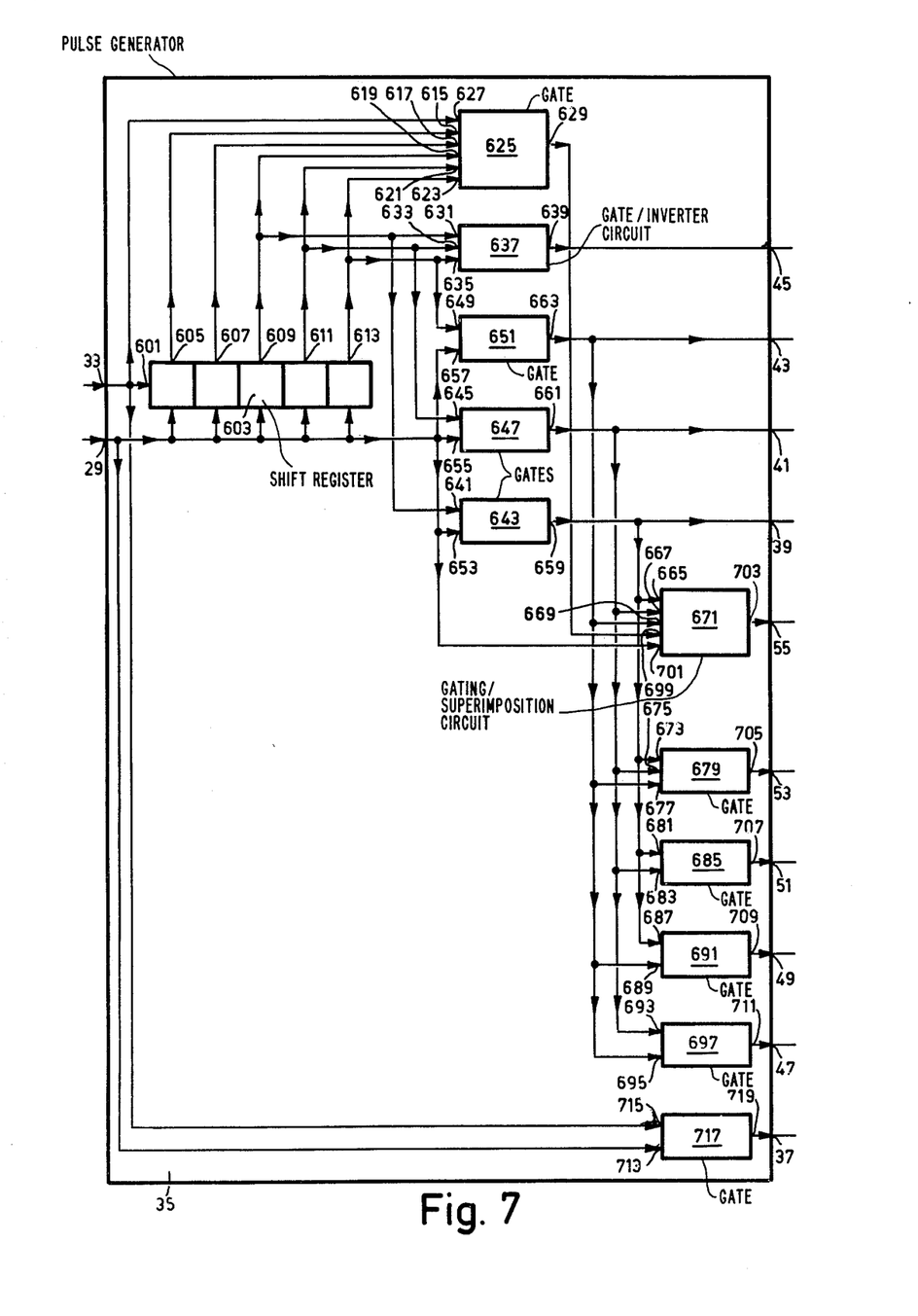
FIG. 7 shows, with reference to a block diagram, a pulse generator circuit for a display apparatus according to the invention.

In FIG. 7, in which the corresponding sections have the same reference numerals as in FIGS. 2, 4, 5 and 6, a block diagram is shown of a possible embodiment of the pulse generator 35.

Field flyback pulses, with a waveform 202 whose trailing edge sets a first section of the shift register from its 0-state to the 1-state, are applied to input 33, which is connected to an input 601 of a shift register 603. Due to line flyback pulses with a waveform 201 applied to each of the five sections of the shift register 603, the second section of the shift register is set from the 0 to the 1 state and the first section is reset to the zero state upon the first line flyback pulse occurring after the trailing edge of the field flyback pulse. The 1 state is shifted one section further in the shift register 603 upon each subsequent line flyback pulse.

The sections of the shift register 603 have outputs 605, 607, 609, 611 and 613 at which, consecutively, the pulses represented in FIG. 3 by the waveforms 204, 205, 206, 207 and 208 arise, which are applied to five inputs 615, 617, 619, 621 and 623 of a gate circuit 625, of which a sixth input 627 is connected to the input 33 for the field flyback pulse. The gate circuit 625 applies an extended field flyback pulse with a waveform 209 to an output 629 which pulse covers the total duration of the original field flyback pulse 202 and the subsequent shift-register output pulses 204, 205, 206, 207 and 208.

The outputs 609, 611 and 613 of shift register 603 are connected to three inputs 631, 633 and 635 of a gate and inverter circuit 637. At an output 639 of this circuit connected to the output 45, this results in a pulse represented by the waveform 213 in FIG. 2, which has the duration of the three pulses 206, 207 and 208 together. This pulse 213 is applied to the clamping switch 315 of the measuring amplifier 187 as described previously.

The output 609 of the shift register 603 is furthermore connected to an input 641 of a gate circuit 643, the output 611 is connected to an input 645 of a gate circuit 647 and the output 613 is connected to an input 649 of a gate circuit 651. The other inputs 653, 655 and 657 of these gate circuits are connected to the line flyback pulse input 29. At an output 659 of the gate circuit 643, which is connected to the output 39, the waveform 210 arises which corresponds to a waveform 206 which has been suppressed during the line flyback period. An output 661 of the gate circuit 647 is connected to the output 41 and carries the waveform 211, i.e. a waveform 207 which is suppressed during the line flyback period, and the output 663 of the gate circuit 651 connected to the output 43 receives waveform 212, i.e. a waveform 208 which is suppressed during the line flyback period. As previously stated, the pulses 210, 211 and 212 serve for sequentially connecting the relevant memory circuits 163, 165 and 167 via the switches 177, 178 and 179 to the output 186 of the measuring circuit 187 during the corresponding line periods at the beginning of each field.

The outputs 659, 661 and 663 of the gate circuits 643, 647 and 651 are furthermore connected to inputs 665, 667 and 669 of a gating and superimposition circuit 671, to an input 673, 675 and 677 of a gate circuit 679 and the outputs 659, 661 are connected pairwise to inputs 681, 683 of a gate circuit 685, the outputs 659, 663 are connected to inputs 687, 689 of a gate circuit 691, the outputs 661, 663 are connected to inputs 693, 695 of a gate circuit 697.

A further input 699 of the gating and superimposition circuit 671 is connected to the output 629 of the gate circuit 625 and an input 701 is connected to the line flyback pulse input 29. An output 703 is connected to the output 55 and supplies the waveform 218 which is a combination of line flyback pulses 201 with an extended field flyback pulse 209 on which inverted waveforms 206, 207 and 208 are superimposed. The waveform 218 is fed to the level insertion circuit 59 where it is split up into a suppression signal and a level insertion signal by amplitude selection at two levels in the signal 218. It will be evident that for circuits for which there is no need to minimize the number of connections between the pulse generator 35 and the level insertion circuit 59, the two signals may alternatively be produced separately in the pulse generator 35 and transferred to the relevant circuit.

An output 705 of the gate circuit 679 is connected to the output 53 at which the waveform 217 develops which occurs during the common time interval of the waveforms 210, 211 and 212 and which is used to render the measuring circuit 187 conductive for the transfer of the measured beam current values to its output 186.

The gate circuit 685 has an output 707 which is connected to output 51 and at which the waveform 216 appears, the gate circuit 691 has an output 709 connected to the output 49 and supplying the waveform 215 and the gate circuit 697 has an output 711 which is connected to the output 47 and at which the waveform 214 appears. During the measurement of the beam current of a gun these waveforms, as previously stated, serve to suppress the beam currents of the other guns by means of the appropriate suppression circuits 95, 93 and 91.

The line flyback pulse input 29 and the field flyback pulse input 33 are furthermore connected to inputs 713 and 715, respectively, of a gate circuit 717 whose output 719 is connected to the output 37. As a result, a combination of field and line flyback pulses appears at this output having the waveform 203 and being employed for suppressing the signal passage through the amplifiers for the R, G and B-signals 133, 135 and 137.

In FIG. 8 in which corresponding sections have the same reference numerals as in the other figures, the video output amplifiers are shown in a corresponding manner as those in FIG. 5. The reference numerals of corresponding sections in the amplifier which were not shown in FIG. 5 are provided with a prime or a double prime respectively.

Instead of being connected to a fixed voltage, the resistors 439, 439', 439'' are now connected to an output 811 of an amplitude correction circuit 813, an input 815 of which is connected to the output 45 of the pulse generator 35 and by means of which the amplitude and the location of the pulse are adjusted to the correct value. As a consequence thereof, a pulse having the same amplitude is supplied to each of the bases of the transistors 431, 431' and 431''. Because the output amplifiers are highly fedback via the mutually equal resistors 437, 437', 437'', the pulse present on the transistor bases is transferred to the collectors of the transistors 433, 433', 433'' without disturbing the mutual equality in amplitude. A level shift of the video signals as shown in FIG. 1 now occurs at the Wehnelt electrodes of the picture tube 21 outside the measuring periods of the beam current reference level control circuit.

FIG. 9 shows a possible circuit for causing a level shift in the cathode circuit of the picture display tube outside the measuring period. Corresponding sections have been given the same reference numerals as in the previous figures. The input circuit is shown of the measuring circuit 187 of FIG. 5. The base of the transistor 301 is now connected via a resistor 817 of approximately 1000 $\Omega$ to the interconnected cathodes of the picture display tube 21. These cathodes are furthermore connected to the collector of a pnp-transistor 819 whose emitter is connected to a positive voltage $(130+V_s)$. The base of the transistor 819 is connected via a resistor 821 to an output 823 of an inverting circuit 825, an input of which is connected to the output 45 of the pulse generator 35. As a consequence the transistor 819 is cut off during the measuring period and the cathode current flows via the resistor 817 to the measuring circuit 187. The cathode voltage is then substantially $+130$ V. The transistor 819, which operates as a switch, is kept fully conducting outside the measuring period by the output voltage of the inverting circuit 825 and the cathode voltage then becomes $+(130+V_s)$ Volts, that is to say a desired level shift of $V_s$ Volts occurs.

It will be evident that some modifications to the pulse generator 35 will enable the measuring times to be transferred to other periods and furthermore, if desired, it is possible to measure during, for example, more consecutive line periods per gun, the sequence in which the gun currents are measured also being optional. For line-sequential colour television systems employing a delay device to make the colour information of one or more preceding line periods available, it is desirable, in order to avoid disturbing effects, to commence the suppression in the chrominance signal at least a number of line periods corresponding to the delay time of the delay device prior to the measuring cycle.

The cathodes of the display tube which in the described embodiment are directly interconnected may be interconnected via a resistive network, if desired.

The variable resistors 195, 196 and 197 for the screen grids, shown in FIG. 2 serve to enable adjustment of a favourable operating point for the colour signal output amplifiers with the transistors 431 and 433 because the permissible voltages for the transistors used at present are not yet sufficiently high. Should this be the case, said variable resistors might be omitted, if desired.

It will be evident that, if desired, the reference level control voltages obtained from the storage circuits 163, 165, 167 may affect the settings of the other electrodes of the guns of the display tube 21 in order to enable the beam currents to be maintained constant when driving the guns with a reference level. To influence the Wehnelt electrode as is the case in the present embodiment, the reference level control voltages may alternatively be applied to other points in the circuit such as, for example, in the colour difference signal circuits prior to combination with the luminance signal channel.

The measuring circuit 187 may, for example, alternatively have an input bridged by a switching transistor instead of by the diode 194.

It is obvious that the term multi-gun colour display tube also includes an assembly of several individual display tubes co-operating in the specified manner.

In the favourable embodiment described above the display tube is used as an input sequence switch for the measuring circuit. It is evident that, if desired, a cathode resistor may be included in each of the cathode circuits of the display tube, in which case a separate input sequence switch may be provided between the cathodes and the input of the measuring circuit.

If no sequence circuit is used in the measuring circuit the control systems must be and must remain mutually equal and they must control the relevant beam current control circuits to the same reference level to enable an advantageous use of the measure according to the invention.

What is claimed is:

1. A colour television display apparatus including a beam current reference level control circuit comprising a measuring circuit included in the cathode circuits of the electron guns of a multi-gun colour display tube for measuring during a measuring period the beam current reference level to be corrected, a level insertion circuit for providing during this measuring period a reference level in a video signal to be applied to each gun of the display tube, and a beam current level correction circuit coupled to the measuring circuit and to a control electrode of each gun of the display tube for obtaining substantially the same beam current reference level in each of the electron guns, wherein said control circuit further comprises a level shift circuit coupled to the electron guns of the display tube for shifting, at each electron gun over substantially the same amount, the mutual position of the reference level in the video signal and a setting voltage of the electron gun occurring outside the measuring period, relative to that mutual position during the measuring period.

2. A colour television display apparatus as claimed in claim 1, wherein the electron guns of the display tube include screen grids which are coupled to the level shift circuit.

3. A colour television display apparatus as claimed in claim 2, wherein each of said screen grids includes a potentiometer for varying the screen grid voltage, said potentiometers each having one end thereof coupled one to the other in a common connection, and wherein the level shift circuit is coupled to said common connection.

4. A colour television display apparatus as claimed in claims 1, 2 or 3 wherein the measuring circuit comprises a plurality of beam current level correction circuits and means for sequentially coupling the cathodes to each of said beam current level correction circuits.